United States Patent
Pompei

(10) Patent No.: US 12,264,969 B1
(45) Date of Patent: *Apr. 1, 2025

(54) DEVICES AND METHODS FOR DETECTING INFLAMMATION

(71) Applicant: Exergen Corporation, Watertown, MA (US)

(72) Inventor: Francesco Pompei, Cambridge, MA (US)

(73) Assignee: Exergen Corporation, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,502

(22) Filed: Dec. 5, 2023

Related U.S. Application Data

(63) Continuation of application No. 18/059,925, filed on Nov. 29, 2022, now Pat. No. 11,874,173, which is a continuation of application No. 15/414,468, filed on Jan. 24, 2017, now abandoned, which is a continuation-in-part of application No. 15/360,424, filed on Nov. 23, 2016, now abandoned.

(60) Provisional application No. 62/259,406, filed on Nov. 24, 2015.

(51) Int. Cl.
  *G01J 5/00* (2022.01)
  *G01J 5/0803* (2022.01)
  *G01K 15/00* (2006.01)

(52) U.S. Cl.
  CPC .......... *G01J 5/0025* (2013.01); *G01J 5/0803* (2013.01); *G01J 2005/0092* (2013.01); *G01K 15/00* (2013.01)

(58) Field of Classification Search
  CPC . G01J 5/0025; G01J 2005/0092; G01K 15/00
  See application file for complete search history.

(56) References Cited

U.S. PATENT DOCUMENTS

| | | | |
|---|---|---|---|
| 3,960,138 A * | 6/1976 | Doss | A61B 5/01 |
| | | | 324/94 |
| 4,832,491 A | 5/1989 | Sharpe et al. | |
| 5,017,019 A | 5/1991 | Pompei | |

(Continued)

FOREIGN PATENT DOCUMENTS

| | | | |
|---|---|---|---|
| CA | 2799737 A1 * | 12/2011 | A61B 5/0059 |
| DE | 10142643 A1 * | 4/2003 | B01J 19/0046 |

(Continued)

OTHER PUBLICATIONS

U.S. Appl. No. 18/529,502, filed Aug. 12, 2024_CA_2799737_A1_H.pdf, Dec. 1, 2011.*

(Continued)

*Primary Examiner* — Gail Kaplan Verbitsky
(74) *Attorney, Agent, or Firm* — Hamilton, Brook, Smith & Reynolds, P.C.

(57) ABSTRACT

A temperature detector is provided that is particularly suited towards the differential measurement of foot temperatures in diabetics. A radiation sensor views a surface area of the body and provides a radiation sensor output. Electronics coupled to the radiation sensor and an ambient temperature sensor compute a normalized surface temperature of the area normalized to a specified ambient temperature as a function of a sensed ambient temperature and a sensed radiation.

20 Claims, 9 Drawing Sheets

(56) References Cited

U.S. PATENT DOCUMENTS

| | | | | |
|---|---|---|---|---|
| 5,272,340 | A | * | 12/1993 | Anbar ................ G01J 5/602 |
| | | | | 250/339.04 |
| 5,293,877 | A | | 3/1994 | O'Hara et al. |
| 5,333,784 | A | | 8/1994 | Pompei |
| 6,010,455 | A | | 1/2000 | Barnett et al. |
| 6,065,866 | A | * | 5/2000 | Kraus ..................... G01J 5/53 |
| | | | | 374/2 |
| 6,077,228 | A | * | 6/2000 | Schonberger ....... A61B 5/015 |
| | | | | 374/45 |
| 6,077,328 | A | | 6/2000 | Brockhoff et al. |
| 6,086,247 | A | | 7/2000 | von Hollen |
| 6,090,050 | A | | 7/2000 | Constantinides |
| 6,292,685 | B1 | | 9/2001 | Pompei |
| 6,381,488 | B1 | * | 4/2002 | Dickey ................ A61B 5/445 |
| | | | | 600/474 |
| 6,398,740 | B1 | | 6/2002 | Lavery et al. |
| 6,440,084 | B1 | | 8/2002 | Gentempo et al. |
| 7,314,309 | B2 | | 1/2008 | Pompei |
| 7,340,293 | B2 | | 3/2008 | McQuilkin |
| 8,044,363 | B2 | * | 10/2011 | Ales ................... A61B 5/0059 |
| | | | | 382/116 |
| 8,360,987 | B2 | | 1/2013 | Kantro et al. |
| 8,553,832 | B2 | | 10/2013 | Camus et al. |
| 8,663,106 | B2 | | 3/2014 | Stivoric et al. |
| 8,714,816 | B2 | | 5/2014 | Yarden et al. |
| 8,725,444 | B2 | | 5/2014 | Shimizu |
| 8,783,946 | B2 | | 7/2014 | Goto |
| 9,095,305 | B2 | | 8/2015 | Engler et al. |
| 9,259,178 | B2 | | 2/2016 | Bloom et al. |
| 9,271,672 | B2 | | 3/2016 | Linders et al. |
| 9,294,749 | B2 | | 3/2016 | Oda |
| 9,326,723 | B2 | | 5/2016 | Petersen et al. |
| 9,787,913 | B1 | | 10/2017 | Koshti |
| 9,897,561 | B2 | * | 2/2018 | Isakov .................. G01N 25/72 |
| 11,874,173 | B1 | * | 1/2024 | Pompei ................... G01J 5/16 |
| 2004/0154550 | A1 | * | 8/2004 | McQuilkin ........... A61B 5/415 |
| | | | | 119/174 |
| 2004/0254472 | A1 | * | 12/2004 | McQuilkin ........... A61B 5/015 |
| | | | | 600/549 |
| 2007/0043408 | A1 | | 2/2007 | Winnett et al. |
| 2007/0091980 | A1 | | 4/2007 | Tanaka |
| 2007/0153478 | A1 | | 7/2007 | Lu |
| 2007/0161921 | A1 | | 7/2007 | Rausch |
| 2008/0192798 | A1 | * | 8/2008 | Weng ...................... G01J 5/53 |
| | | | | 374/2 |
| 2008/0275310 | A1 | | 11/2008 | Kim |
| 2010/0245634 | A1 | | 9/2010 | Ahdoot |
| 2012/0068848 | A1 | | 3/2012 | Campbell et al. |
| 2012/0078088 | A1 | * | 3/2012 | Whitestone .......... A61B 5/0077 |
| | | | | 600/425 |
| 2013/0050878 | A1 | | 2/2013 | Perez et al. |
| 2013/0116573 | A1 | * | 5/2013 | Herman ................ A61B 5/444 |
| | | | | 600/474 |
| 2013/0261494 | A1 | | 10/2013 | Bloom et al. |
| 2016/0058377 | A1 | * | 3/2016 | Butte ..................... A61B 5/685 |
| | | | | 600/556 |
| 2016/0183879 | A1 | * | 6/2016 | Goldish ............... A61B 5/0077 |
| | | | | 600/407 |
| 2016/0213260 | A1 | | 7/2016 | Pompei |
| 2016/0271274 | A1 | | 9/2016 | Ivkov et al. |
| 2017/0156594 | A1 | | 6/2017 | Stivoric et al. |
| 2017/0258335 | A1 | | 9/2017 | Heller |
| 2021/0212595 | A1 | | 7/2021 | Mills et al. |
| 2022/0101992 | A1 | | 3/2022 | Porter et al. |

FOREIGN PATENT DOCUMENTS

| | | | | |
|---|---|---|---|---|
| DE | 102010028913 | A1 | * 11/2011 | ........... A61B 5/0077 |
| FR | 3 108 172 | A1 | 9/2021 | |
| JP | H02268236 | A | 11/1990 | |
| JP | H0663851 | B2 | 8/1994 | |
| JP | 2018031542 | A | 3/2018 | |
| RU | 2339300 | C1 | * 11/2008 | |
| WO | WO-2005092177 | A1 | * 10/2005 | ......... A61B 10/0012 |
| WO | 2010/065052 | | 6/2010 | |
| WO | WO-2011127247 | A2 | * 10/2011 | ............... A61B 5/01 |

OTHER PUBLICATIONS

U.S. Appl. No. 18/529,502, filed Aug. 12, 2024_RU_2339300_C1_H.pdf,Nov. 27, 2008.*

U.S. Appl. No. 18/529,502, filed Aug. 12, 2024_WO_2011127247_A2_H.pdf,Oct. 13, 2011.*

U.S. Appl. No. 18/529,502, filed Aug. 13, 2024_WO_2005092177_A1_H.pdf,Oct. 6, 2005.*

U.S. Appl. No. 18/529,502, filed Dec. 5, 2024_DE_10142643_A1_H.pdf,Apr. 24, 2003.*

U.S. Appl. No. 18/529,502, filed Dec. 5, 2024_DE_102010028913_A1_H.pdf,Nov. 17, 2011.*

Anthem® and American Medical Association "Coverage Guideline for TempTouch® Dermal Thermometer" 4 pages, Oct. 22, 2008.

Armstrong, D.G. et al., "Skin Temperature Monitoring Reduces the Risk for Diabetic Foot Ulceration in High-Risk Patients," American Journal of Medicine, 120:1042-1046 (2007).

Armstrong, D.G., et al., "Does Dermal Thermometry Predict Clinical Outcome in Diabetic Foot Infection? Analysis of Data from the SIDESTEP* Trial," International Wound Journal Clinical Research, 3(4):302-307 (2006).

Baum, S., "Automating Thermometer Data to Spot Warning Signs for Diabetic Foot Ulcers," downloaded from www.medcitynews.com/2015/08/automating-thermometer-data-to-spot . . . 2 pages, Jan. 21, 2016.

Ferguson, S. et al., Presentation entitled "Testing Plantar Foot Temperature: Infrared Termographics, Evidence-Based Clinical Applications for the Physical Therapist," presented at PHT 816 Capstone Practicum, Fall 2014.

Foltyński, P. et al., "The Influence of Ambient Temperature on Foot Temperature in Patients with Diabetic Foot Ulceration," Biocybernetics and Biomedical Engineering, 34:178-183 (2014).

Frykberg, R.G., et al., "Diabetic Foot Disorders: A Clinical Practice Guideline (2006 revision)," Journal of Foot & Ankle Surgery, 45(5): S-2-S66 (2006).

Hazenberg, C. E.V.B. et al., "Assessment of Signs of Foot Infection in Diabetes Patients Using Photographic Foot Imaging and Infrared Thermography," Diabetes Technology & Therapeutics, 16(6):1-9 (2014).

Houghton, V.J. et al., "Is an Increase in Skin Temperature Predictive of Neuropathic Foot Ulceration in People with Diabetes? A Systematic Review and Meta-Analysis," Journal of Foot and Ankle Research, 6:31, 13 pages (2013).

Keith, E., Department of Health & Human Services approval of Podimetrics Remote Temperature Monitoring System TM 510(k) Indications for Use, No. K150557, including 510(i) Summary, 11 pages (Oct. 8, 2015).

Lavery, L.A. et al., "Home Monitoring of Foot Skin Temperatures to Prevent Ulceration," Diabetes Care, 27 (11):2642-2647 (2004).

Lavery, L.A. et al., "Preventing Diabetic Foot Ulcer Recurrence in High-Risk Patients," Diabetes Care, 30(1):14-20 (2007).

Lin, C., Department of Health & Human Services approval of Xilas Medical, Incorporated's TempTouch® Clinical Electronic Thermometer, No. K050137, including Statement of Indications for Use, 3 pages, (Mar. 18, 2005).

Liu, C. et al., "Infrared Dermal Thermography on Diabetic Feet Soles to Predict Ulcerations: a Case Study," Proc. of SPIE, 8572:1-9 (2013).

Nardin, R.A., et al., "Foot Temperature in Healthy Individuals, Effects of Ambient Temperature and Age," Journal of American Podiatric Medical Association, 100(4):258-264 (2010).

Papanas, N. et al., "Association Between Foot Temperature and Sudomotor Dysfunction in Type 2 Diabetes," J. of Diabetes Science and Technology, 4(4):803-807 (2010).

Papanas, N. et al., "Foot Temperature in Type 2 Diabetic Patients with or without Peripheral Neuropathy," Exp. Clin. Endocrinol Diabetes, 117:44-47 (2009).

(56) References Cited

OTHER PUBLICATIONS

Peregrina-Barreto, H. et al., "Quantitative Estimation of Temperature Variations in Plantar Angiosomes: A Study Case for Diabetic Foot," Computational and Mathematical Methods in Medicine, vol. 2014, Article ID 585306, 10 pages (2014).

Sudha, G.F. et al., "Studies On Skin Temperature Changes on a Diabetic Foot," Biomed, Proceedings 21:683-686 (2008).

Van Netten, J.J. et al., "Diagnostic Values for Skin Temperature Assessment to Detect Diabetes-Related Foot Complications," Diabetes Technology & Therapeutics, 16(11):714-721 (2014).

Vanore, J., "Clinical Usefulness of Infrared Thermography," Chapter 28, 4 pages (2003).

Waugh, A., "Idea Draws on Engineering and Business to Help Diabetics," downloaded from http://news.mit.edu/2012/podimetrics-lgo-0120, 3 pages, (Oct. 1, 2016).

Xilas Medical Inc. News Release, "Xilas' TempTouch® Home Temperature Monitoring Device Now Available to Diabetic Foot Consumers," 2 pages (Jul. 11, 2005).

Xilas Medical Inc. product overview "TempTouch®" downloaded from http://www.xilas.com/products-temptouch.php , 1 page (Jan. 15, 2006).

Yazdanpanah, L. et al., "Literature Review on the Management of Diabetic Foot Ulcer," World Journal of Diabetes, 6 (1):37-53 (2015).

Zeytinoglu, M. et al., "Diabetes and Aging: Meeting the Needs of a Burgeoning Epidemic in the United States," Health Systems and Reform, Taylor & Francis Publishers, DOI: 10.1080/23288604.2015.1037042, 1:2, 128-141 (2015).

U.S. Appl. No. 18/059,925, filed Sep. 15, 2023_JP_2018031542_A_H .pdf, Mar. 2018.

Baum, S., "Automating Thermometer Data to Spot Warning Signs for Diabetic Foot Ulcers," downloaded from www.medcitynews.com/2015/08/automating-thennometer-data-to-spot . . . 2 pages, Jan. 21, 2016.

Keith, E., Department of Health & Human Services approval of Podimetrics Remote Temperature Monitoring System™ 5 I0(k) Indications for Use, No. K150557, including 510(i) Summary, 11 pages (Oct. 8, 2015).

\* cited by examiner

DEVICES AND METHODS FOR DETECTING INFLAMMATION

RELATED APPLICATIONS

This application is a continuation of U.S. application Ser. No. 18/059,925, filed on Nov. 29, 2022, which is a continuation of U.S. application Ser. No. 15/414,468, filed on Jan. 24, 2017, now abandoned, which is a continuation-in-part of U.S. application Ser. No. 15/360,424, filed on Nov. 23, 2016, now abandoned, which claims the benefit of U.S. Provisional Application No. 62/259,406, filed on Nov. 24, 2015. The entire teachings of the above applications are incorporated herein by reference.

BACKGROUND

In recent years, infrared thermometers have come into wide use for detection of temperature of adults. To obtain core temperature readings, infrared thermometers adapted to be inserted into the patient's ear or placed at the patient's axilla or scanned across the forehead over the temporal artery have been very successful. Such thermometers measure temperature of distal ear canal tissue or axilla tissue or forehead tissue and calculate arterial core temperature via heat balance.

Core temperature is a term used to describe deep body temperature and is approximated by oral, rectal, ear, pulmonary artery, esophageal and bladder temperatures and the like. The arterial heat balance approach is based on a model of heat flow through series thermal resistances from the arterial core temperature to, for example, the ear skin temperature and from the ear skin temperature to ambient temperature. Accordingly, after sensing both the skin temperature and ambient temperature, the arterial core temperature can be calculated. Infrared ear thermometers using the arterial heat balance are disclosed in U.S. Pat. Nos. 4,993,419; 5,012,813; 5,199,436; 5,381,796; 5,445,158; 5,653,238 and 5,271,407, the entire teachings of which are incorporated herein by reference. Infrared thermometers designed for axillary temperature measurements and using the arterial heat balance are disclosed in U.S. Pat. Nos. 5,893,833; 5,874,736; 6,056,435; 6,299,347; 6,499,877; and 7,314,309, the entire teachings of which are incorporated herein by reference. Infrared temporal artery thermometers using the arterial heat balance are disclosed in U.S. Pat. Nos. 6,292,685 and 7,787,938, the entire teachings of which are incorporated herein by reference.

Infrared thermometers have also been used to detect regions of elevated temperature. An injury results in increased blood flow, which in turn results in higher surface temperatures at the injured region. Often it is the difference in temperature between two regions that is of interest. For example, when one limb is injured, another limb may be measured to provide a reference temperature. The difference between the reference temperature and the temperature of the injured region is indicative of the extent of the injury. Radiation detectors for providing differential temperature readings are disclosed in U.S. Pat. No. 5,017,019, the entire teachings of which are incorporated by reference.

Neuropathy is a common and serious condition that can occur in patients with diabetes. The most common type of diabetic neuropathy affects sensor nerves in the legs and feet. The loss of foot sensation and, particularly, the ability to feel pain translates into diabetic patients being less likely to notice inflammation or wounds to their feet, which often progress into ulcers, infections, deformities, and bone and joint injuries. Such injuries may ultimately require amputation of the foot or limb. Early detection of neuropathy and/or foot injuries is paramount in preventing further progression of the condition in diabetic patients.

Clinical studies funded by the VA Research and Development Service are aimed at improving the self-care and self-monitoring practices of at-risk veterans with diabetes. The studies aim to prevent ulcerative and non-ulcerative foot lesions and risks for peripheral vascular disease through the use of dermal thermometry. As reported in Lavery, L. A. et al, "Preventing Diabetic Foot Ulcer Recurrence in High-Risk Patients," *Diabetes Care vol.* 30:1 (2007), patients following an enhanced foot care program that included using an infrared skin thermometer to measure temperatures on six foot sites each day had a significantly lower prevalence of foot ulceration after 15 months, as compared with patients that did not measure foot temperature. In the study of Lavery, a temperature difference of greater than 4° F. between corresponding sites on the left and right feet trigged patients to seek additional care. Dermal thermometry can provide an early identification of inflammation in the extremities, particularly the feet, of diabetic patients.

SUMMARY OF THE INVENTION

A temperature detector is provided that is particularly suited towards the differential measurement of foot temperatures in diabetics. By providing normalized temperature readings of both feet of a diabetic patient, the temperature detector can provide an early indication of neuropathy and/or foot injuries, prompting the patient to seek treatment as early as possible and preventing further progression of the condition. The measured temperatures are normalized to account for the effect of ambient temperature on foot skin temperatures.

A temperature detector includes a radiation sensor, which views a surface area of a body and provides a radiation sensor output, an ambient temperature sensor, and electronics coupled to the radiation sensor and the ambient temperature sensor that compute a normalized surface temperature of skin at the viewed surface area of the body. The normalized temperature is normalized to a specified ambient temperature as a function of a sensed ambient temperature and a sensed radiation.

The radiation sensor can scan over the surface area of the body, and the sensed radiation utilized by the function can be a peak radiation of the scanned surface area. The function can further include an assumed core temperature, such as 99.4° F. The specified ambient temperature can be in the range of 70° F. to 80° F., such as 77° F. The surface area of the body can be an extremity, such as a foot, leg, hand, or arm. The temperature detector can, for example, provide accuracy for skin temperatures of up to 99° F. and ambient temperatures of up to 86° F. The temperature detector can further include a display for displaying the normalized temperature, or an error message. An error message can occur if a sensed skin temperature derived from the radiation sensor output indicates a fever, such as if the sensed skin temperature is above 99° F., or if a sensed ambient temperature is above 86° F. The radiation sensor can be a thermopile and the ambient temperature sensor can be a thermistor. The temperature detector can include an extending portion located between the radiation sensor which views a surface area of a body and a handle portion of the detector, allowing a user to more comfortably operate the temperature detector while measuring extremities of the user's body. The extending portion can include a gooseneck near the radiation sensor to view a distally facing surface of the body.

A method of providing a skin temperature includes measuring infrared radiation by viewing a surface area of the body with a radiation sensor, sensing an ambient temperature to which the body is exposed, and, in electronic circuitry, using the measured infrared radiation and the sensed ambient temperature, determining a normalized skin temperature for a specified ambient temperature.

Measuring infrared radiation can include the radiation sensor scanning over the surface area of the body. The measured infrared radiation can be a peak radiation of a scanned surface area of the body. Determining a normalized skin temperature can include using an assumed core temperature, such as 99.4° F. The method can further include displaying the normalized skin temperature, or an error message.

A method includes detecting an ambient temperature, measuring infrared radiation by viewing a first surface area of the body with a radiation sensor, and, in electronic circuitry, using the measured infrared radiation from the first surface area and the sensed ambient temperature, determining a first normalized skin temperature for a specified ambient temperature. The method further includes measuring infrared radiation by viewing a second surface area of the body with the radiation sensor and, in electronic circuitry, using the measured infrared radiation from the second surface area and the sensed ambient temperature, determining a second normalized skin temperature for the specified ambient temperature.

The method can further include providing a display of the first and second normalized skin temperatures, and/or providing a display of the difference between the first normalized temperature and the second normalized temperature.

A detector includes a radiation sensor which views a surface area of a body and provides a radiation sensor output, an ambient temperature sensor, and electronics coupled to the radiation sensor and the ambient temperature sensor which compute a perfusion rate of the body as a function of a sensed ambient temperature and a sensed skin temperature derived from the radiation sensor output.

A method of detecting inflammation includes providing a temperature detector and obtaining a first normalized surface temperature of a first surface area and a second normalized surface temperature of a second area. The method further includes calculating a difference between the first and second normalized surface temperatures. The first and second surface areas can be located on contralateral regions of the body. The specified ambient temperature can be a temperature at which a difference of about 4° F. between first and second normalized surface temperatures can be indicative of inflammation in one of the first and second surface areas. Obtaining the first and second normalized surface temperatures can include scanning the temperature detector over the first and second surface areas. The first and second normalized surface temperatures can be computed as a function of the peak radiation sensor outputs over the first and second scanned surface areas of the body.

Figure 1:
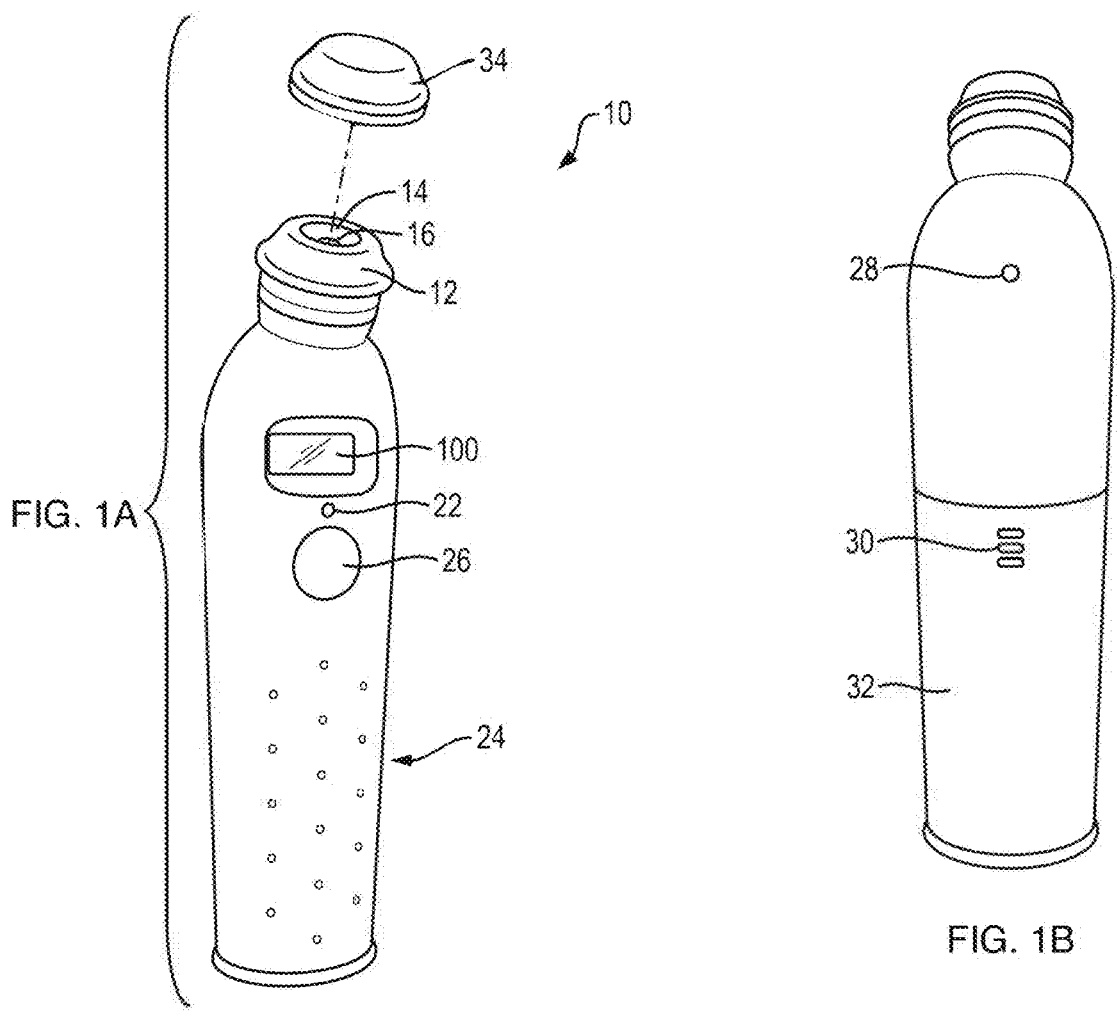
FIGS. 1A and 1B illustrate (A) a front view and (B) a rear view of an infrared thermometer embodying the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

FIGS. 1A and 1B illustrate a thermometer adapted for temperature measurement of feet or other extremities. The thermometer 10 scans a surface area of a body, for example, a foot, with probe 12. Probe 12 includes reflective probe cone 14 and probe sensor lens 16 at the apex of the cone. A radiation sensor included within the thermometer 10 views a target surface area of the body through probe sensor lens 16. The radiation sensor is preferably a thermopile for rapid response, but other radiation detectors may also be used. The thermometer is adapted to be held by the handle portion 24 with the probe 12 scanning over a surface area of the foot. Once in position, the button 26 is pressed to begin a measurement. Button 26 remains depressed as the user lightly touches the skin with probe 12 and scans the detector over a surface area of the foot. Optional LED indicator lights 22, 28 can illuminate or blink to indicate to a user that a measurement is taking place. After scanning is completed, the user releases button 26. Electronics within the housing may then compute sensed skin temperature from peak radiation detected during the scan, and using arterial heat balance equations, compute a normalized temperature for display on the display 100. An optional cap 34 can be provided with thermometer 10 to cover probe 12 when the thermometer is not in use. Optional battery compartment 32 with thumb-push ridges 30 can also be included to provide access for battery replacement.

The hardware of thermometer 10 is substantially similar to that of the TAT2000 temporal artery thermometer (Exergen, Watertown, MA). To provide for variations in skin type or color, probe cone 14 can be of low emissivity in order to provide emissivity compensation as disclosed in U.S. Pat. No. 4,636,091, the entire contents of which are incorporated herein by reference. Probe cone 14, alternatively referred to as a cup, can be formed in a heat sink (not shown) within thermometer 10 to improve the thermal characteristics of the sensor assembly, as disclosed in U.S. Pat. No. 7,787,938, the entire contents of which are incorporated herein by reference. Preferably, the heat sink in which the probe cone 14 is formed is of aluminum. Alternatively, the heat sink may be of brass, nickel plated in the region of probe cone 14.

Figure 2:
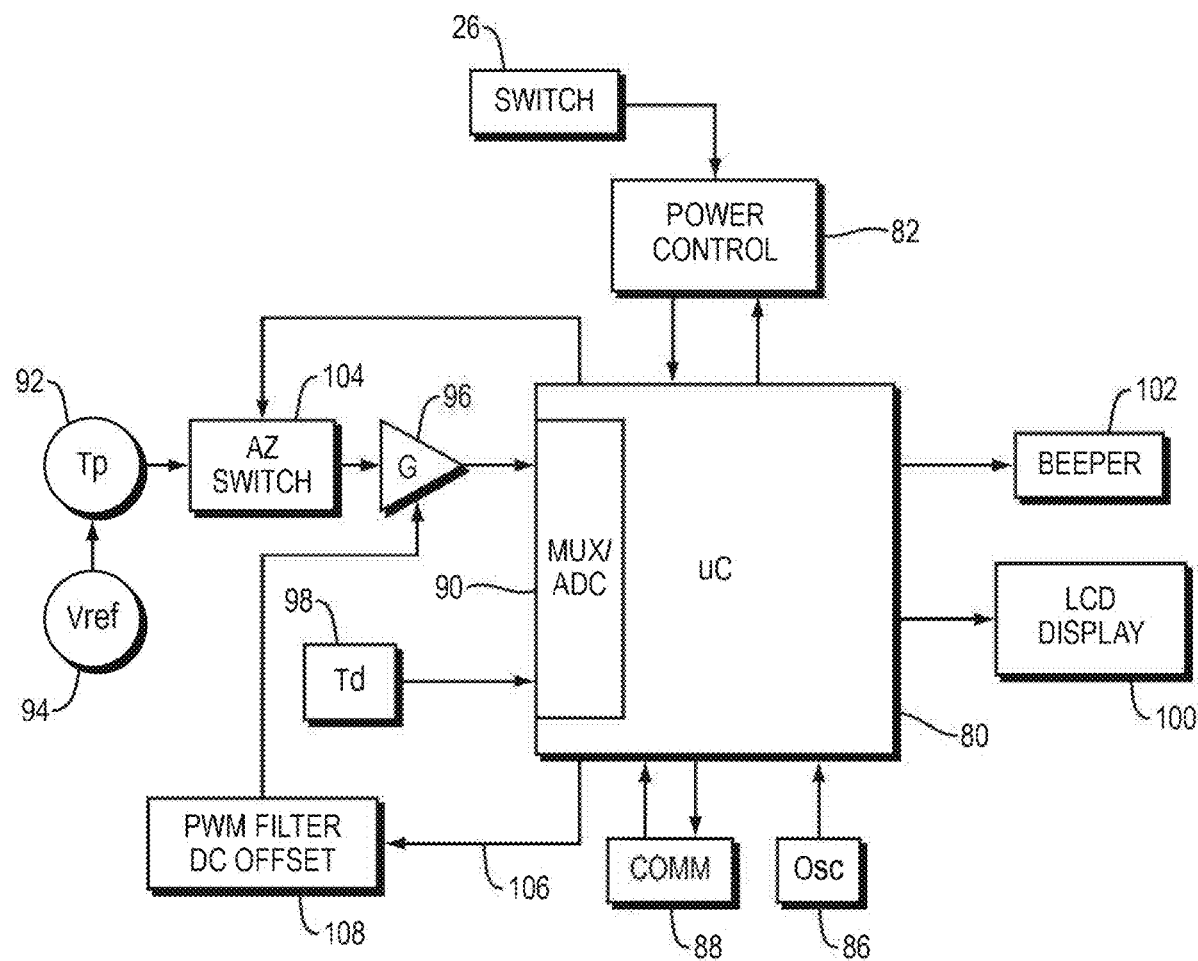
FIG. 2 illustrates an electrical block diagram of the electronics of the thermometer of FIG. 1.

An electrical block diagram for the radiation detector is presented in FIG. 2. A microprocessor 80 is at the heart of the circuit. A power control circuit 82 responds to activation of the button switch 26 by the user to apply power to the microprocessor and other elements of the circuit. That power is maintained until the microprocessor completes the measurement cycle and signals the power control 82 to power down. The microprocessor is clocked by an oscillator circuit 86 and may communicate with an external source for programming and calibration through communication conductors 88. The temperature determined by the microprocessor is displayed on the liquid crystal display 100, and completion of the temperature processing is indicated by a beeper 102. During the measurement process, the microprocessor takes readings through a multiplexer/analog-to-digital converter 90. The preferred microprocessor 80 includes an internal 8-bit A-D converter. To minimize expense, the circuit can be designed to rely solely on that A-D converter.

Thermopile 92 behind lens 16 provides a voltage output signal equal to the fourth power difference between target temperature and the temperature of the thermopile cold junction, offset by voltage reference 94. The voltage output from the thermopile is amplified by an amplifier 96, having a gain in the order of 1000, which also provides an offset determined by a pulse width modulated filter 108 controlled by the microprocessor. Through operation of the multiplexer, the microprocessor provides an analog-to-digital conversion of the amplified sensor output and of the detector temperature $T_d$ provided by temperature sensor 98, such as a thermistor. The temperature sensor 98 is positioned to sense the substantially uniform temperature of the thermopile cold junction, can, and heat sink. An auto zero switch 104 is included to allow for isolation of the amplifier 96 from the thermopile 92 during a calibration sequence as disclosed in greater detail in U.S. Pat. No. 7,314,309, the entire contents of which are incorporated herein by reference.

It is well known that the output of the thermopile is proportional to $(T_s^4 - T_d^4)$ where $T_s$ is the target skin temperature viewed by the radiation detector and $T_d$ is the temperature of the detector measured by sensor 98 and can also be taken as ambient temperature $T_a$. From that relationship, $T_s$ can be computed. More specifically, the relationship between the thermopile and a target, which may be the skin, can be expressed as follows:

$$T_t^4 = (KH) + T^4 \qquad (1)$$

where $T_t$ is the target temperature, K is a gain factor, H is a sensed voltage from the thermopile, and T is a junction temperature of the thermopile, as disclosed in U.S. Pat. No. 5,199,436, the entire contents of which are incorporated by reference. Where the target is skin, skin temperature can thus be determined according to the following equation:

$$T_s = \sqrt[4]{(KH) + T^4} \qquad (2)$$

The junction temperature T can be the hot junction temperature $T_H$, which is determined from the sensed thermopile voltage, cold junction temperature, and a thermopile coefficient. The thermopile coefficient can be specified at a predetermined temperature and is temperature compensated by the electronic circuit as a function of temperature between the hot and cold junctions, specifically the average temperature. The electronic circuit can also determine a gain factor K as a function of the difference between a calibration temperature and a temperature between hot and cold junction temperatures.

Regarding compensation for temperatures relative to an average temperature of the thermopile, Equation 1 can be re-expressed as:

$$T_t^4 = Kh(H - H_0) + T_H^4 \qquad (3)$$

where $T_t$ is again the target temperature, Kh is a gain calibration factor, H is the radiation sensor signal which is offset by $H_0$ such that $(H - H_0) = 0$ when the target is at the cold junction temperature of the device to counter any electronic offsets in the system, and $T_H$ is the hot junction temperature. Accordingly, Kh is compensated relative to the average temperature of the thermopile rather than the cold junction, or ambient, temperature. Further, the hot junction temperature rather than the cold junction temperature is referenced in the relationship.

Accordingly, where the target is skin, skin temperature can thus be determined according to the following equation:

$$T_S = \sqrt[4]{Kh(H - H_0) + T_H^4} \qquad (4)$$

The gain calibration factor is temperature compensated by the relationship:

$$Kh = G\left(1 - T_{CO}\left(\frac{T_H - T_C}{2} - T_z\right)\right) \qquad (5)$$

where G is an empirically determined gain in the system. $T_{CO}$ is the temperature coefficient of the Seebeck coefficient of the thermopile, $T_H$ is the hot junction temperature, $T_C$ is the cold junction temperature, and $T_z$ is the temperature at which the instrument was calibrated. The use of the average temperature of the thermopile rather than the cold junction temperature provides for a much more accurate response where a target temperature is significantly different from the ambient temperature.

Figure 3:
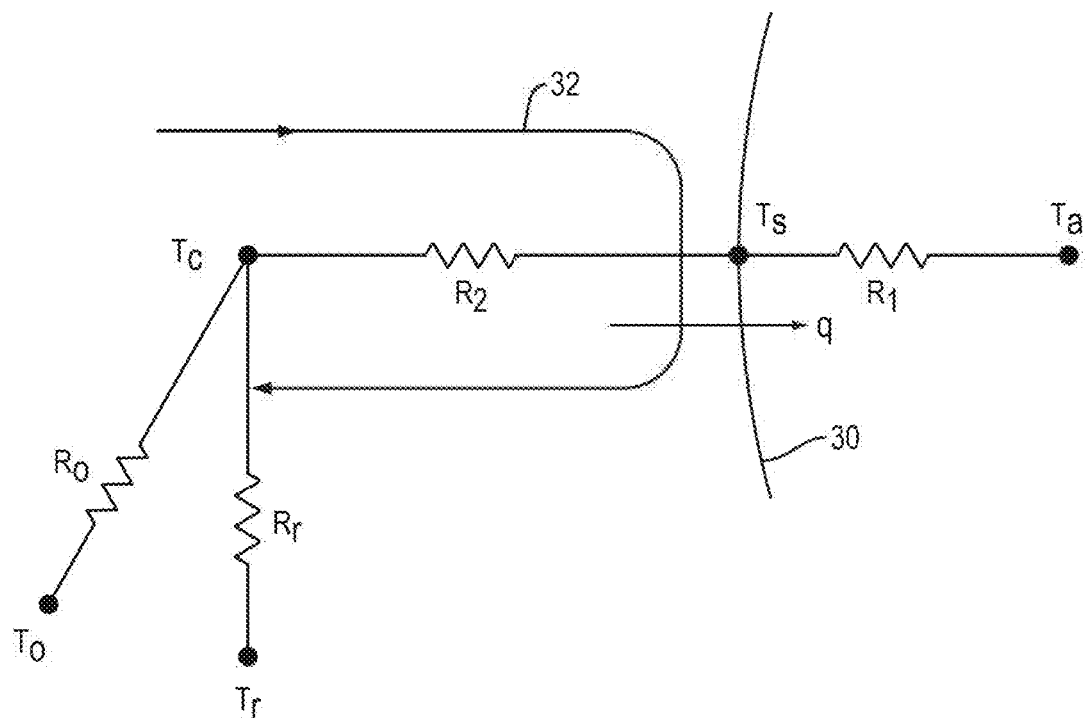
FIG. 3 illustrates an arterial heat balance model.

It is also known that, based on a determined skin temperature and an ambient temperature to which the skin is exposed, an internal core temperature can be computed using the arterial heat balance approach illustrated in FIG. 3. Heat flux q from the internal core temperature $T_c$ passes through the skin 30 to the ambient environment at temperature $T_a$. The skin is thus held at some intermediate temperature $T_s$.

Heat loss of skin to the environment through resistance R1 can be calculated with the following well-known equation:

$$q = hA(T_s - T_a) \qquad (6)$$

where q is heat flow, A is surface area, $T_s$ and $T_a$ the skin and ambient temperatures, respectively, and h is an empirically determined coefficient which includes a radiation view factor between the skin tissue and the ambient environment. Although the exact form of the equation is fourth-power due to the radiation exchange, the linearized form provides excellent accuracy for skin temperatures over a range of interest of about 90° to 105° F.

Heat flow from the core arterial source to the skin through resistance R2 is via blood circulation 32, which is many times more effective than tissue conduction. Thermal transport via the circulation can be described by the following equation:

$$q = wc(T_c - T_s) \quad (7)$$

where q again is heat flow, w is blood mass flow rate, c is blood specific heat, and $T_c$ and $T_s$ are core and skin temperatures, respectively.

Accordingly, the skin can be viewed thermally as tissue being warmed by its blood supply as governed by Equation 7, balanced by radiating heat to ambient as governed by Equation 6.

Equating:

$$hA(T_s - T_a) = wc(T_c - T_s) \quad (8)$$

Simplifying by dividing by the surface area A:

$$h(T_s - T_a) = pc(T_c - T_s) \quad (9)$$

where p is blood flow per unit area, also termed perfusion rate.

Equation 9 then provides a method for calculating any of skin temperature, core temperature, and perfusion, where other variables are known. Accordingly, by sensing infrared radiation from a skin surface (i.e., heat flux), a thermometer 10 can detect any of skin temperature, core temperature, and perfusion. Other internal temperatures such as oral $T_o$ and rectal $T_r$ can also be determined using assumed resistances $R_o$ and $R_r$.

For example, and as in prior ear, axillary, and temporal thermometers, internal core temperature can be computed from the function above. Solving Equation 9 for core temperature $T_c$ yields:

$$T_C = \left(1 + \frac{h}{pc}\right)(T_s - T_a) + T_a \quad (10)$$

where $T_s$ and $T_a$ are the skin and ambient temperatures, respectively. The function can be seen to include a weighted difference of surface temperature and ambient temperature with a weighting coefficient h/pc.

Figure 4:
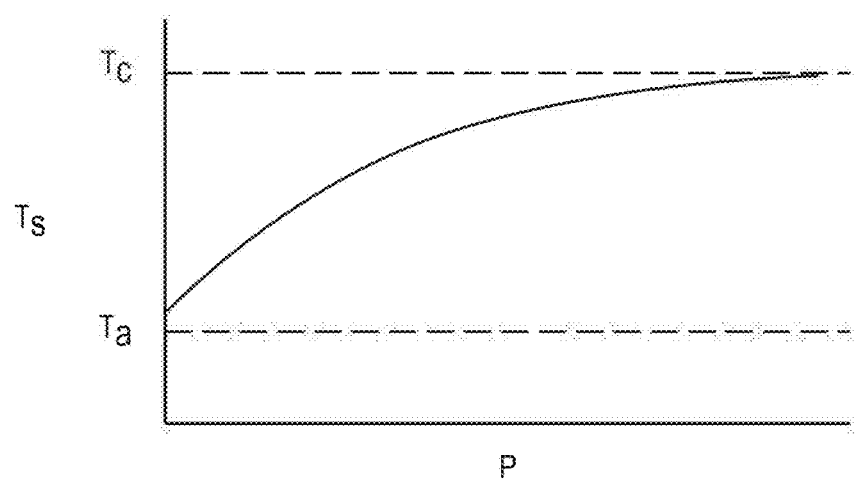
FIG. 4 illustrates change in skin temperature relative to ambient and core temperatures versus change in perfusion rate.

As disclosed in greater detail in U.S. Pat. No. 7,314,309, the entire contents of which are incorporated herein by reference, skin temperature varies exponentially with perfusion, and perfusion rate varies according to the condition of the patient. FIG. 4 illustrates change in skin temperature with change in perfusion rate as predicted by the heat balance model and empirically. With no perfusion, the resistance R2 is very high such that the skin temperature is close to ambient temperature ($T_a$). With increased perfusion, however, the resistance R2 is reduced, and the skin temperature approaches the core temperature ($T_c$). Generally, the perfusion rate is in the region of FIG. 4 where there is a substantial change in skin temperature with change in perfusion rate.

Figure 5:
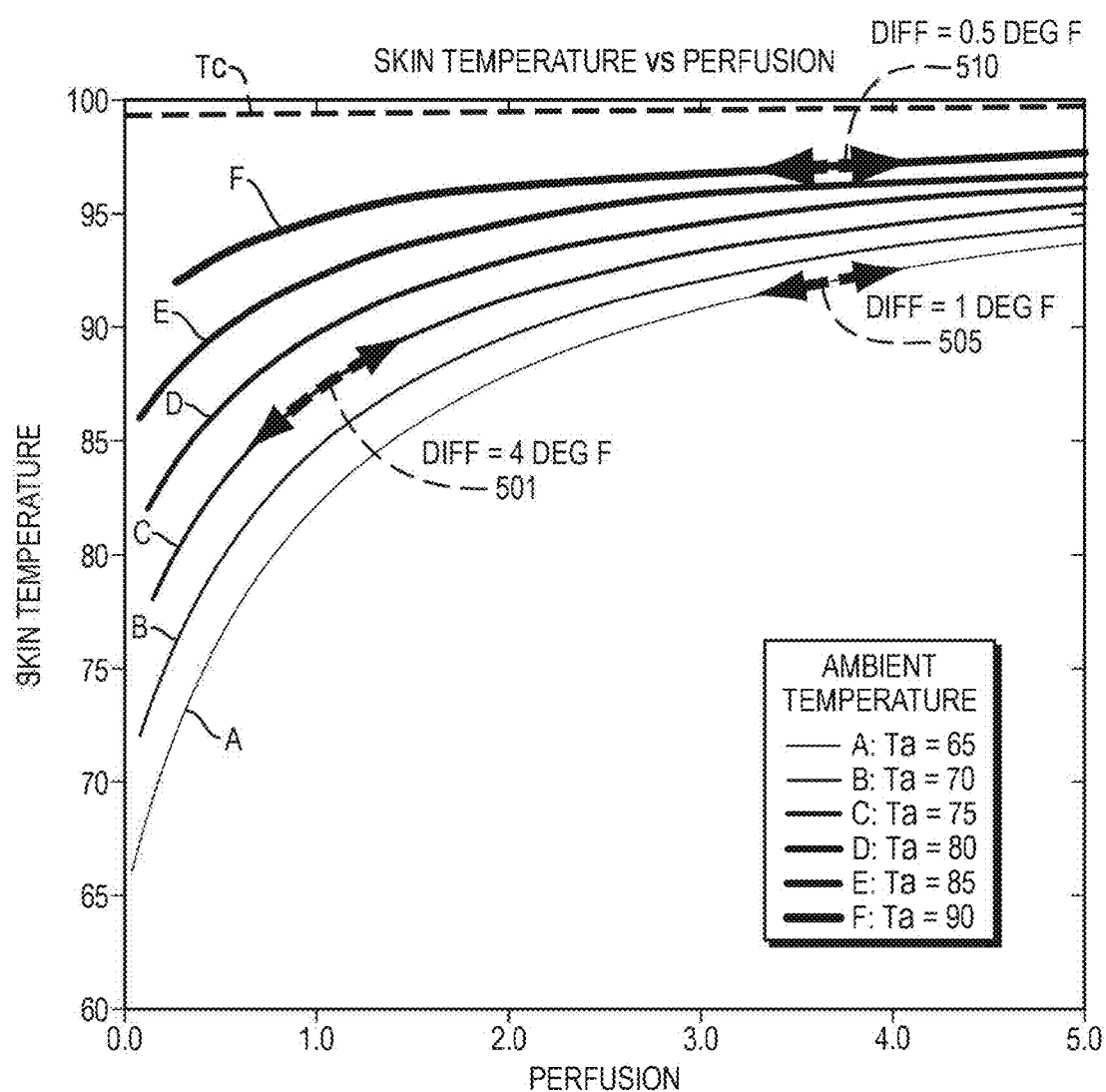
FIG. 5 illustrates the effect of ambient temperature on the change in skin temperature versus perfusion curve.

From FIG. 4, it can be seen that ambient temperature affects skin temperature. As illustrated in FIG. 5, the curve representing the change in skin temperature versus perfusion varies depending upon ambient temperature. For example, a patient with a perfusion rate of 1.0 lb/hr·ft² in an environment with an ambient temperature of 75° F. will have a foot skin temperature of approximately 87° F., as may be seen on curve C of FIG. 5. However, in an environment with an ambient temperature of 90° F., the same patient will have a foot skin temperature close to 95° F., as may be seen on curve F of FIG. 5. Additionally, as perfusion rates increase and skin temperatures approach arterial temperature, the effect of ambient temperature on skin temperature becomes less pronounced, as illustrated by curves A-F moving closer together as perfusion rates increase.

Figure 6:
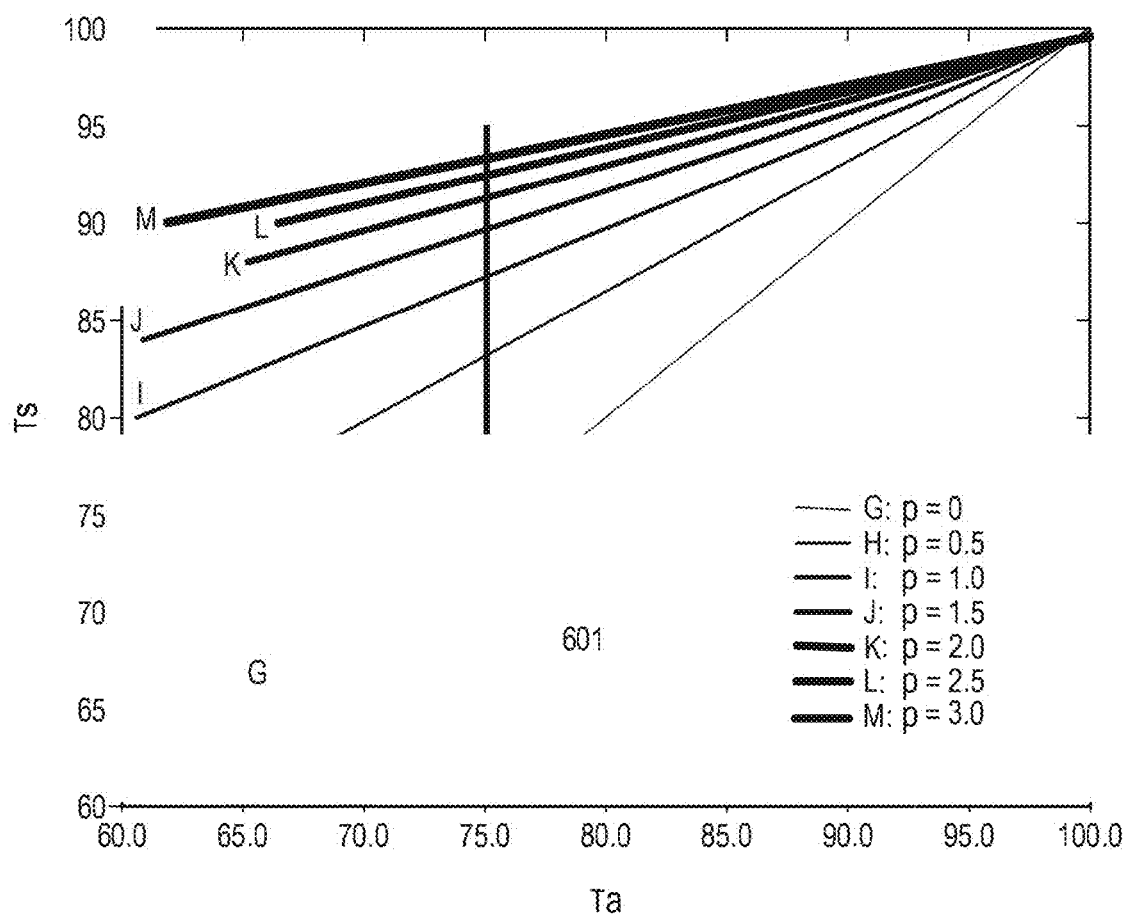
FIG. 6 illustrates the effect of perfusion rate on the change in skin temperature versus change in ambient temperature lines.

Illustrated in FIG. 6 are lines representing the change in skin temperature versus ambient temperature. It can be seen from FIG. 6 that the relationship between skin temperature $T_s$ and ambient temperature $T_a$ varies depending upon perfusion rate. For example, with no perfusion, skin temperature would match ambient temperature, as indicated by line G. As perfusion rate increases (moving from line H up to line M), it can be seen that ambient temperature has less of an effect on skin temperature.

It is known that an injury causes an increase in perfusion, resulting in a higher skin temperature at the injured area relative to other areas of the body. Furthermore, from data presented by Netten, P. M., et al., "Skin microcirculation of the foot in diabetic neuropathy," *Clinical Science*, 91:559-565 (1996), diabetic patients experience an increased total skin blood flow due to increased anastomotic shunt flow, causing overperfusion of capillaries. Consequently, diabetics with neuropathy are observed to have higher skin temperatures than healthy individuals.

It is generally accepted that a difference in skin temperature of about 4° F. (about 2.2° C.) between contralateral regions of interest is indicative of a neuropathy and/or inflammation due to injury. However, this assumption is based on average conditions where a patient's perfusion rate is near 1.0 lb/hr·ft² and ambient temperature is approximately 77° F. Accordingly, while a 4° F. temperature difference may be observed for an increase in perfusion of about 0.5 lb/hr·ft² under average conditions (as marked in FIG. 5 with region 501 on line C), which would be indicative of an injury or inflammation, a much smaller difference would be expected if the same patient were in an environment having an ambient temperature of, for example, 90° F. (line F of FIG. 5). Additionally, for a patient with elevated perfusion, such as a diabetic having neuropathy in both feet, a much smaller temperature difference would be expected to represent a similar jump in perfusion between an injured and uninjured foot. For example, for a diabetic patient with neuropathy having a perfusion rate of about 3.5, an injury, such as an ulceration, may result in a temperature difference of about 1° F. between a neuropathic foot and an ulcerated neuropathic foot if the patient is an environment with an ambient temperature of 65° F. (marked on line A of FIG. 5 as region 505). If the patient is in an environment with an ambient temperature of 90° F., a temperature difference of about 0.5° F. (marked on line F of FIG. 5 as region 510) for the same patient would be expected.

Correcting for the effect of ambient temperature on skin temperature can assist with the detection of injuries by providing normalized temperature readings that remove the variations that result from different ambient temperatures. Accounting for ambient temperature is useful in calculating temperature differentials for both the early detection of neuropathy and the early detection of injury due to neuropathy. While neuropathy is a systemic condition in diabetics, it frequently progresses at varying rates at the extremities, particularly, the feet. In other words, it is unlikely that a patient with developing neuropathy has the same extent of neuropathy in both feet at the same time. Accordingly, a detected temperature differential is helpful as an early indication that neuropathy is present or progressing. The temperature differential is also useful for detecting an injury in a patient with progressed neuropathy who lacks sensation in the feet.

Due to the effects of ambient temperature on skin temperature, a normalized skin temperature $T_s^1$ can be obtained to represent what the patient's skin temperature would be if they were in an ambient environment of, for example, 75° F. For example, any reading along any of curves A, B, C, D, E, and F of FIG. 5 could be normalized to fall on curve C. The normalized temperature then provides the patient or caregiver with the ability to determine a meaningful temperature differential. Similarly, in FIG. 6, any reading along any of lines G, H, I, J, K, L, and M can be normalized to fall at $T_a=75$, as indicated by line 601.

Solving Equations 9 or 10 for p, perfusion can be expressed as:

$$p = \frac{h/c}{\frac{T_c - T_a}{T_s - T_a} - 1} \quad (11)$$

Representing Equation 11 in an alternate form:

$$p = \frac{h/c}{\frac{T_c - T_s}{T_s - T_a}} \quad (12)$$

The perfusion of a patient can be determined by measuring the skin temperature $T_s$ of the patent and ambient temperature $T_a$ with thermometer 10. Core temperature $T_c$ can be assumed to be 99.4° F., the mean arterial core temperature of an adult. Alternatively, $T_c$ can be a measured value.

Solving Equations 9 or 10 for $T_s$, skin temperature can be expressed as:

$$T_s = \frac{T_c - T_a}{1 + \frac{h}{pc}} + T_a \quad (13)$$

Accordingly a normalized skin temperature $T_s^1$ at a normalized ambient temperature $T_a^1$ can be expressed as:

$$T_s^1 = \frac{T_c - T_a^1}{1 + h/pc} + T_a^1 \quad (14)$$

Substituting p in Equation 14 with the expression of p of Equation 12, a normalized skin temperature $T_s^1$ can be expressed as:

$$T_s^1 = \frac{T_c - T_a^1}{1 + h / \left(\frac{h/c}{\frac{T_c - T_s}{T_s - T_a}}\right)c} + T_a^1$$

Simplifying:

$$T_s^1 = \frac{T_c - T_a^1}{T_c - T_a}(T_s - T_a) + T_a^1 \quad (15)$$

Thus, a measured skin temperature $T_s$ can be normalized to $T_s^1$ for a given standard ambient temperature $T_a^1$, provided that the ambient temperature $T_a$ and core temperature $T_c$ are known. The normalized skin temperature $T_s^1$ can be processed through Equation 15 in microprocessor 80 and displayed on display 100. Note that it is not necessary to obtain a value for $T_s$ prior to computing $T_s^1$. As thermometer 10 senses infrared radiation from a skin surface, which corresponds to skin temperature as described above with respect to Equation 4, microprocessor 80 can compute $T_s^1$ directly using the output of the radiation sensor.

From normalized skin temperatures of two body locations, for example, a right foot and a left foot, a standard temperature differential can be applied to detect an injury or neuropathy in one of the two locations. To utilize the accepted temperature differential of 4° F. that is regarded as being indicative of injury, measured skin temperatures can be normalized to an ambient temperature of 77° F. However, measured skin temperatures can be normalized for any given ambient temperature $T_a^1$. Given ambient temperatures of interest are likely to be in the range of 70° F.-80° F., for example, 70°, 72°, 75°, 77°, and 80°.

Thermometer 10 can provide as an output at display 100 a normalized temperature after the measurement of each foot. To utilize thermometer 10, a patient or caregiver scans a first foot of the patient, obtains a normalized temperature readout of the first foot, and repeats the process for the second foot of the patient. The normalized temperature readouts of each foot are noted and compared. If the difference between the normalized temperature readouts is greater than an established threshold, for example, 4° F., there is an indication that neuropathy and/or a foot injury is present in the foot having the higher normalized temperature. Alternatively, or in addition, the thermometer 10 can hold the first and second normalized temperature readouts in memory and provide as an output at display 100 the difference between the temperature readouts. For patients with high perfusion rates, or in other circumstances where one established threshold such as 4° F. in not practicable, a table can be provided listing normalized temperatures, or ranges of normalized temperatures, alongside differential values that, if obtained, would be indicative of an injury.

Alternatively, thermometer 10 can provide as an output at display 100 a perfusion rate (obtained according to Equations 11 or 12) after the measurement of each foot in addition to, or instead of, a normalized temperature. For example, a perfusion rate of a first location $p_1$ can be measured by:

$$p_1 = \frac{h/c}{\frac{T_c - T_s}{T_s - T_a}} \quad (16)$$

A perfusion rate of a second location $p_2$ can be measured by:

$$p_2 = \frac{h/c}{\frac{T_c - T_s}{T_s - T_a}} \quad (17)$$

It is noted that perfusion rates $p_1$ and $p_2$, as they are derived from a heat transfer definition, can be expressed as perfusion per unit area rather than perfusion per unit mass. For example, with h expressed in units of BTU/hr·ft²·° F. and c expressed in units of BTU/lb·° F., perfusion rates can be expressed in units of lb/hr·ft².

The absolute value of the difference of $p_1$ and $p_2$ can then be used to assess whether an injury is present. Particularly for patients with high perfusion rates where the 4° F. threshold would not apply and where smaller differentials in temperature may be indicative of an injury, a direct comparison of perfusion rates can be helpful. For patients with high perfusion rates, a table can be provided listing perfusion rates, or ranges of perfusion rates, alongside differential values that, if obtained, would be indicative of an injury.

Thermometer 10 can obtain spot measurements of contralateral locations on the patient's body. For example, thermometer 10 can be used to first obtain a normalized temperature measurement of the big toe on the right foot, followed by then obtaining a normalized temperature measurement of the big toe on the left foot. In such a manner, various locations on the body can be spot checked.

Preferably, thermometer 10 is scanned over an area substantially covering the bottom surface of each foot, as opposed to spot checking specific locations of each foot. Scanning over an area provides the most accurate detection of hot spots, which may otherwise remain undetected through spot checks. A peak value of skin temperature is detected and then automatically used by thermometer 10 in the calculation of perfusion and/or normalized skin temperature. Additionally, for thermoregulation, patients should be allowed to settle before temperature measurements are obtained. For example, a patient moving from a very cold environment to a very hot environment will experience a gradual increase in skin temperature as his or her body acclimates to the new environment. If a normalized temperature is obtained prior to acclimation of the patient's skin to the hot environment, the relationship between the ambient temperature, as detected by the thermometer, and the detected skin temperature, as described above, may not apply. It is recommended that patients be allowed to acclimate for approximately 10 to 30 minutes in the environment in which the normalized temperature will be obtained. Similarly, for an accurate detection of ambient temperature, it is recommended that the thermometer likewise be allowed to acclimate to the environment in which temperature measurements will be obtained.

Because the thermometer utilizes an assumed internal core temperature $T_c$ of 99.4° F., the mean arterial temperature of an adult, a falsely elevated normalized temperature can result for patients having a fever or other condition. Accordingly, the thermometer may only be accurate for skin temperatures of up to about 99° F. Similarly, due to the smaller temperature differentials that occur at higher ambient temperatures, thermometers may only be accurate for use in environments with ambient temperatures of up to about 86° F. Thermometer 10 can be configured to display an error message when accuracy thresholds are reached. For example, display 100 can display an error message when a skin temperature above 99° F. is detected or when an ambient temperature above 86° F. is detected. The display can further indicate that a fever is detected, prompting the patient to seek alternate care.

While the feet provide a particularly problematic area for diabetics, other extremities of the body can also be affected by neuropathy. In addition to feet, thermometers of the present invention can view or scan other anatomical areas of interest on the body, such as legs, hands, and arms, to provide an early indication of neuropathy or injury in those areas.

Figure 7A:
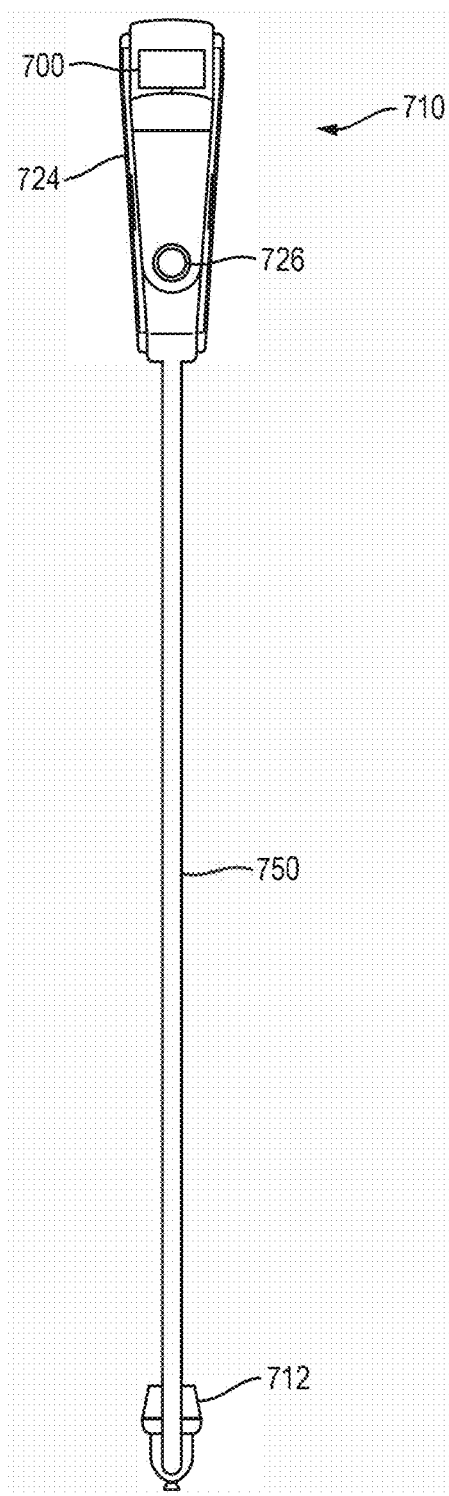
FIG. 7A illustrates a front view of an extended infrared thermometer.
Figure 7B:
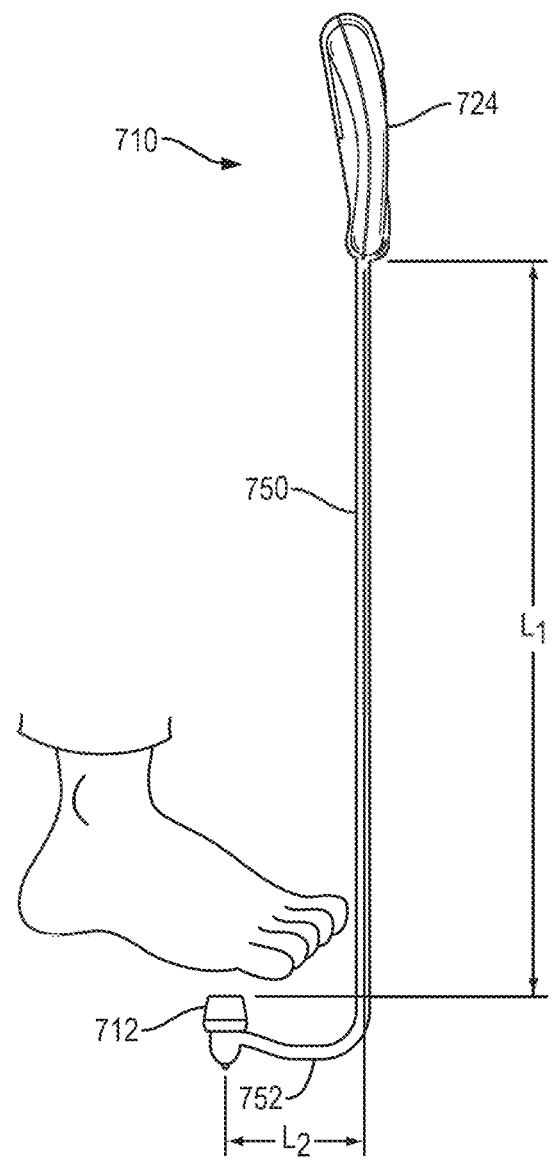
FIG. 7B illustrates a side view of the extended infrared thermometer of FIG. 7B applied to a foot.

For patients with limited mobility or who may otherwise have difficulty reaching their extremities, an extended temperature detector can be provided, as illustrated in FIGS. 7A-7B. Temperature detector 710 includes an extending portion 750 located between a handle portion 724 and a probe 712. The extending portion 750 advantageously allows a user to place probe 712 at, for example, the sole of a foot, without having to bend over. Handle portion 724 includes button 726 and display 700. Accordingly, a user is able to operate the detector 710 with button 726 and easily read a temperature or perfusion output on display 700 while the user's upper body and hands remain some distance away from the area being measured. Button 726 can optionally illuminate to indicate to a user that a measurement is taking place, or alternatively, separate indicator light(s) can be included.

Figure 8A:
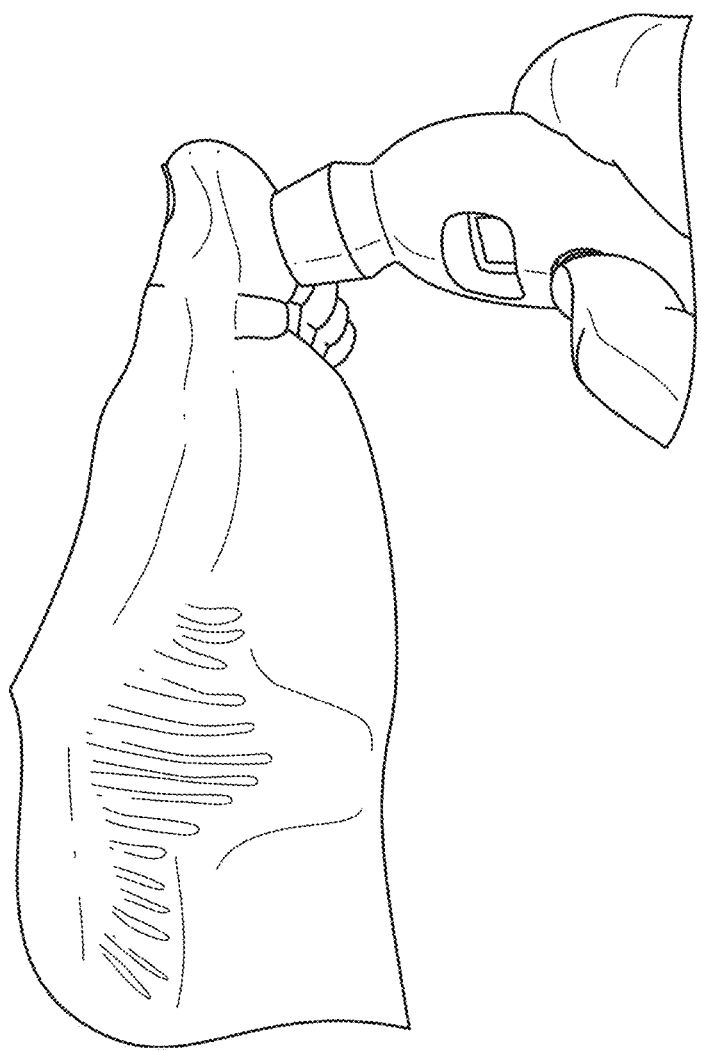
FIG. 8A illustrates use of an infrared thermometer of the present invention.

Use of a temperature detector without an extension is shown in FIG. 8A, with a user placing a probe end of the temperature detector (e.g., temperature detector 10) against the big toe of his left foot. As shown, the user depresses a button (e.g., button 26) of the temperature detector as the user scans the probe of the detector over a surface area of the big toe.

Figure 8B:
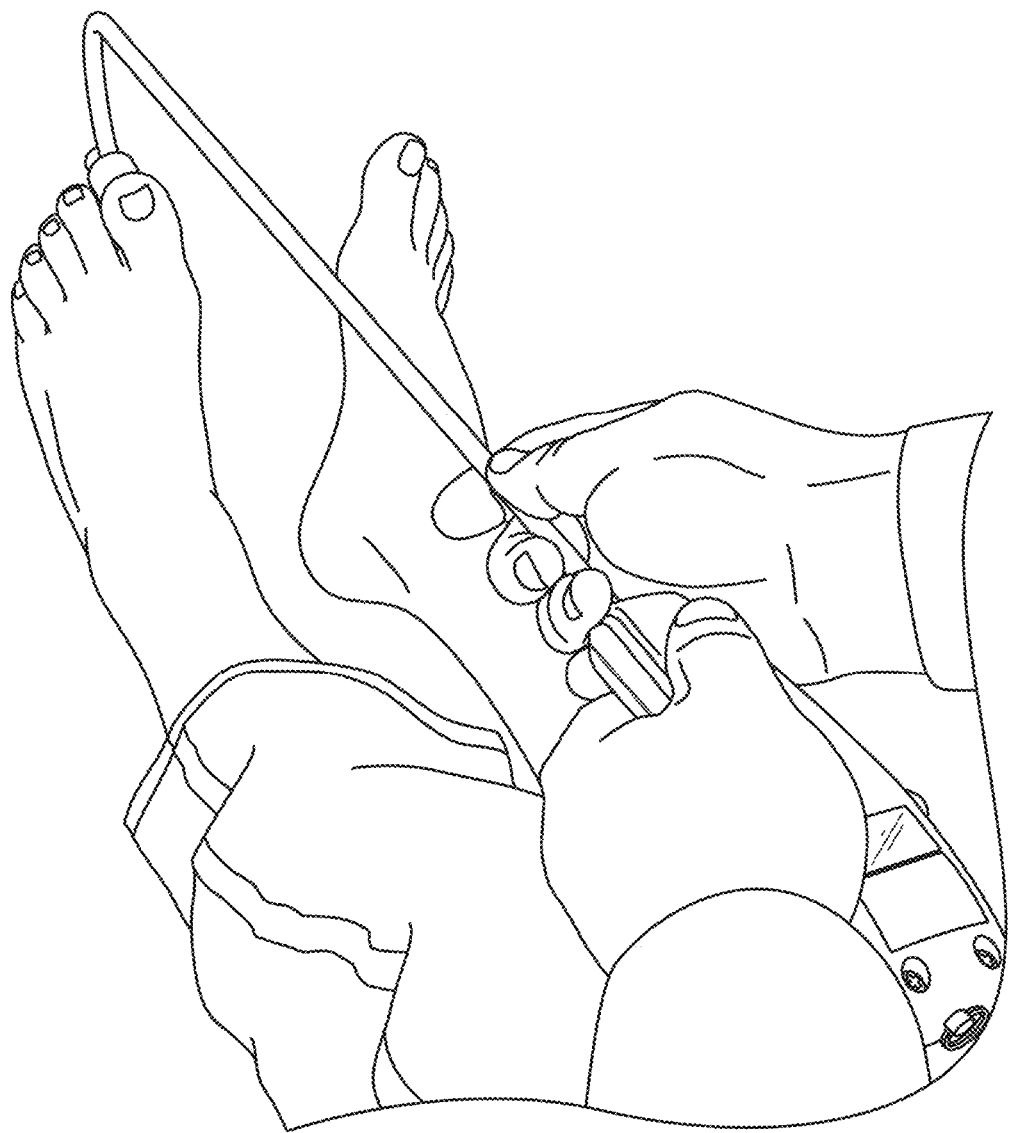
FIG. 8B illustrates use of an extended infrared thermometer of the present invention.

Use of a temperature detector with an extension is shown in FIG. 8B. The user holds the detector (e.g., temperature detector 710) by a handle portion (e.g., handle portion 724) while scanning the probe end of the detector over the surface area of the big toe. The user is able to operate the detector (e.g., by depressing a button, such as button 726) while extending portion (e.g., extending portion 750) allows the user to maintain his upper body at a greater distance away from his foot.

Returning to FIGS. 7A-7B, extending portion 750 can have a first length $L_1$ that is configured to extend a distance between a user's hands and an extremity of the user, such as a foot. First length $L_1$ can be, of about 10 inches to about 30 inches. For example, first length $L_1$ can be about 10 inches, about 12 inches, about 18 inches about 24 inches, or about 30 inches. Extending portion 750 can also include a bend, curve, or gooseneck portion that is configured to place the probe end of the detector at a surface facing away from the user, such as the sole of the foot. As illustrated, extending portion 750 includes a curved portion 752 having a second length $L_2$. Second length $L_2$ can be of about 2 inches to about 5 inches. For example, second length $L_2$ can be about 2 inches, about 3 inches, about 4 inches, or about 5 inches.

Extending portion 750 can optionally be collapsible. For example, extending portion can be a telescoping arm such that first length $L_1$ is variable. A user can thus adjust the temperature detector such that probe 712 is placed at a customizable distance away from handle portion 724.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An injury monitoring system comprising:
   a radiation sensor which views a surface area of a body and provides a radiation sensor output;
   an ambient temperature sensor which provides an ambient temperature sensor output; and
   electronics coupled to the radiation sensor and the ambient temperature sensor which compute a normalized surface temperature of the surface area normalized to a specified ambient temperature as a function of the ambient temperature sensor output and the radiation sensor output, the computed normalized surface temperature of the surface area indicative of an injury when a temperature differential between the surface area of the body and another surface area of the body, calculated using the computed normalized surface temperature, is greater than a threshold temperature differential.

2. The system of claim 1 further comprising a display in communication with the electronics configured to provide an indication of injury at the surface area based upon the computed normalized surface temperature.

3. The system of claim 2 wherein the display is located on a user device.

4. The system of claim 2 wherein the indication of injury at the surface area is further based upon another normalized surface temperature of a different surface area of the body.

5. The system of claim 1 wherein the radiation sensor and the ambient temperature sensor are located on a shared detector.

6. The system of claim 1 wherein the electronics coupled to the radiation sensor and the ambient temperature sensor further compute a perfusion rate as a function of the computed normalized surface temperature of the surface area.

7. The system of claim 1 wherein the injury is one of inflammation or neuropathy.

8. The system of claim 1 wherein the surface area of the body is located on a foot.

9. The system of claim 1 wherein the radiation sensor scans over the surface area of the body.

10. The system of claim 1 wherein the radiation sensor is a thermopile.

11. The system of claim 1 wherein the ambient temperature sensor is a thermistor.

12. The system of claim 1, wherein the electronics are configured to calculate the normalized surface temperature ($T_s^1$) according to the following:

$$T_s^1 = \frac{T_c - T_a^1}{T_c - T_a}(T_s - T_a) + T_a^1$$

where $T_s$ is a sensed skin temperature based on the radiation sensor output, $T_a$ is a sensed ambient temperature based on ambient temperature sensor output, $T_a^1$ is the specified ambient temperature, and $T_c$ is a core temperature.

13. The system of claim 12 wherein the core temperature is a measured core temperature of the body.

14. The system of claim 12 wherein the core temperature is an assumed core temperature of the body.

15. A method of detecting injury comprising:
receiving a measured ambient sensor output and a radiation sensor output from a temperature detector comprising:
a radiation sensor which views a surface area of a body and provides the radiation sensor output; and
an ambient temperature sensor which provides the ambient temperature sensor output;
computing, by electronics coupled to the temperature detector, a first normalized surface temperature of a first surface t area of the body as a function of the ambient sensor output and the radiation sensor output;
computing, by the electronics coupled to the temperature detector, a second normalized surface temperature of a second surface area of the body as a function of the ambient sensor output and the radiation sensor output; and
calculating a difference between the first normalized surface temperature and the second normalized temperature, the calculated difference indicative of an injury.

16. The method of claim 15 further comprising displaying, a display, an indication of the injury based on the calculated difference between the first normalized surface temperature and the second normalized temperature.

17. The method of claim 16 wherein the display is located on a user device.

18. The method of claim 15, wherein the first surface area and second surface area are located at contralateral regions of the body.

19. The method of claim 15, wherein obtaining the first and second normalized surface temperatures includes scanning the temperature detector over the first and second surface areas.

20. The method of claim 15 wherein a calculated difference of at least about 4° F. is indicative of inflammation in one of the first and second surface areas.

* * * * *